(12) United States Patent
Hosaka et al.

(10) Patent No.: US 6,589,493 B2
(45) Date of Patent: Jul. 8, 2003

(54) GAS PURIFICATION-TREATING AGENTS AND GAS PURIFYING APPARATUSES

(75) Inventors: Shoichi Hosaka, Tokyo; Masato Kawai; Chie Samata, both of Kanagawa, all of (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/208,273

(22) Filed: Dec. 9, 1998

(65) Prior Publication Data
US 2001/0043899 A1 Nov. 22, 2001

(51) Int. Cl.⁷ .............. C01B 3/54; C01B 5/00; C01B 31/18; C01B 31/20
(52) U.S. Cl. ............ 423/230; 423/220; 423/246; 423/247; 423/248
(58) Field of Search ............ 502/339, 66, 407, 502/415; 423/246, 247, 248, 220, 230

(56) References Cited

U.S. PATENT DOCUMENTS

| | | | |
|---|---|---|---|
| 3,758,666 A | * | 9/1973 | Frevel et al. |
| 4,536,375 A | * | 8/1985 | Holt et al. |
| 4,623,632 A | * | 11/1986 | Lambert et al. |
| 4,713,224 A | * | 12/1987 | Tamhankar et al. |
| 5,110,569 A | * | 5/1992 | Jain |
| 5,202,096 A | | 4/1993 | Jain ............ 422/190 |
| 5,238,670 A | * | 8/1993 | Louise et al. |
| 5,484,580 A | * | 1/1996 | Sharma |
| 5,662,873 A | * | 9/1997 | Gary |
| 5,907,076 A | * | 5/1999 | Ou et al. |
| 6,093,379 A | * | 7/2000 | Golden et al. |
| 6,113,869 A | * | 9/2000 | Jain et al. |

FOREIGN PATENT DOCUMENTS

| JP | 59-26334 | | 6/1984 |
|---|---|---|---|
| JP | 08-57240 | | 3/1996 |
| JP | 10-85588 | * | 4/1998 |

* cited by examiner

Primary Examiner—Tom Dunn
Assistant Examiner—Christina Ildebrando
(74) Attorney, Agent, or Firm—Armstrong, Westerman & Hattori, LLP (57) ABSTRACT

Disclosed are a gas purification-treating agent and a gas purifying apparatus, which treat carbon monoxide and/or hydrogen contained in a gas in the presence of oxygen. The gas purification-treating agent consists of an adsorbent having carbon dioxide and/or water adsorptivity, and a metal or metal compound which is carried on the adsorbent and activates oxidation reaction of carbon monoxide and/or hydrogen. The gas purifying apparatus has the gas purification-treating agent contained in a container having a gas inlet and a gas outlet. The adsorbent adsorbs carbon dioxide and/or water contained originally in the gas, as well as, carbon dioxide and/or water to be formed by the oxidation reaction of carbon monoxide and/or hydrogen. The metal or metal compound is at least one selected from Au-on-metal oxides, Au-on-metal hydroxides and an Au colloidal powder, or palladium and/or platinum.

10 Claims, 9 Drawing Sheets

GAS PURIFICATION-TREATING AGENTS AND GAS PURIFYING APPARATUSES

BACKGROUND OF THE INVENTION AND RELATED ART STATEMENT

The present invention relates to a gas purification-treating agent and a gas purifying apparatus, more specifically to a gas purification-treating agent and a gas purifying apparatus which remove carbon monoxide and/or hydrogen contained in a gas by effecting oxidation reaction in the presence of oxygen, and which also remove carbon dioxide and/or water formed by the oxidation reaction together with carbon dioxide and/or water contained originally in the gas, and particularly to a gas purification-treating agent and a gas purifying apparatus, in a system where air is sucked and compressed and the compressed gas is fed as a raw gas to an air separation plant, which effect oxidization of carbon monoxide and/or hydrogen to remove such impurities from the compressed air.

Conventionally, when carbon monoxide and/or hydrogen contained in a gas are/is to be removed, it is carried out generally to remove first the substantial part of water contained originally in the gas, i.e. the water formed by condensation under compression, and then to convert carbon monoxide and/or hydrogen by catalytic reaction into carbon dioxide and/or water which are/is then removed by adsorption together with the residual water of condensation and carbon dioxide contained originally in the gas.

For example, in an air separation plant for producing oxygen, nitrogen, etc., the impurities such as water and carbon dioxide contained in the raw air are removed by adsorption to an adsorbent such as activated alumina and zeolite. However, carbon monoxide and hydrogen which are contained each in an amount of about 1 to 5 ppm in the atmospheric air cannot be removed by using the adsorbent for adsorbing and removing carbon dioxide and water. Meanwhile, it is difficult to remove carbon monoxide by means of distillation, because the boiling point of carbon monoxide is close to that of nitrogen, so that carbon monoxide remains as an impurity in the product nitrogen, resulting in the failure of producing a high-purity nitrogen gas, disadvantageously. Meanwhile, hydrogen, which has a low boiling point, can be separated by means of distillation. However, a distillation plate must be additionally installed so as to achieve separation of nitrogen and hydrogen.

Figure 12:
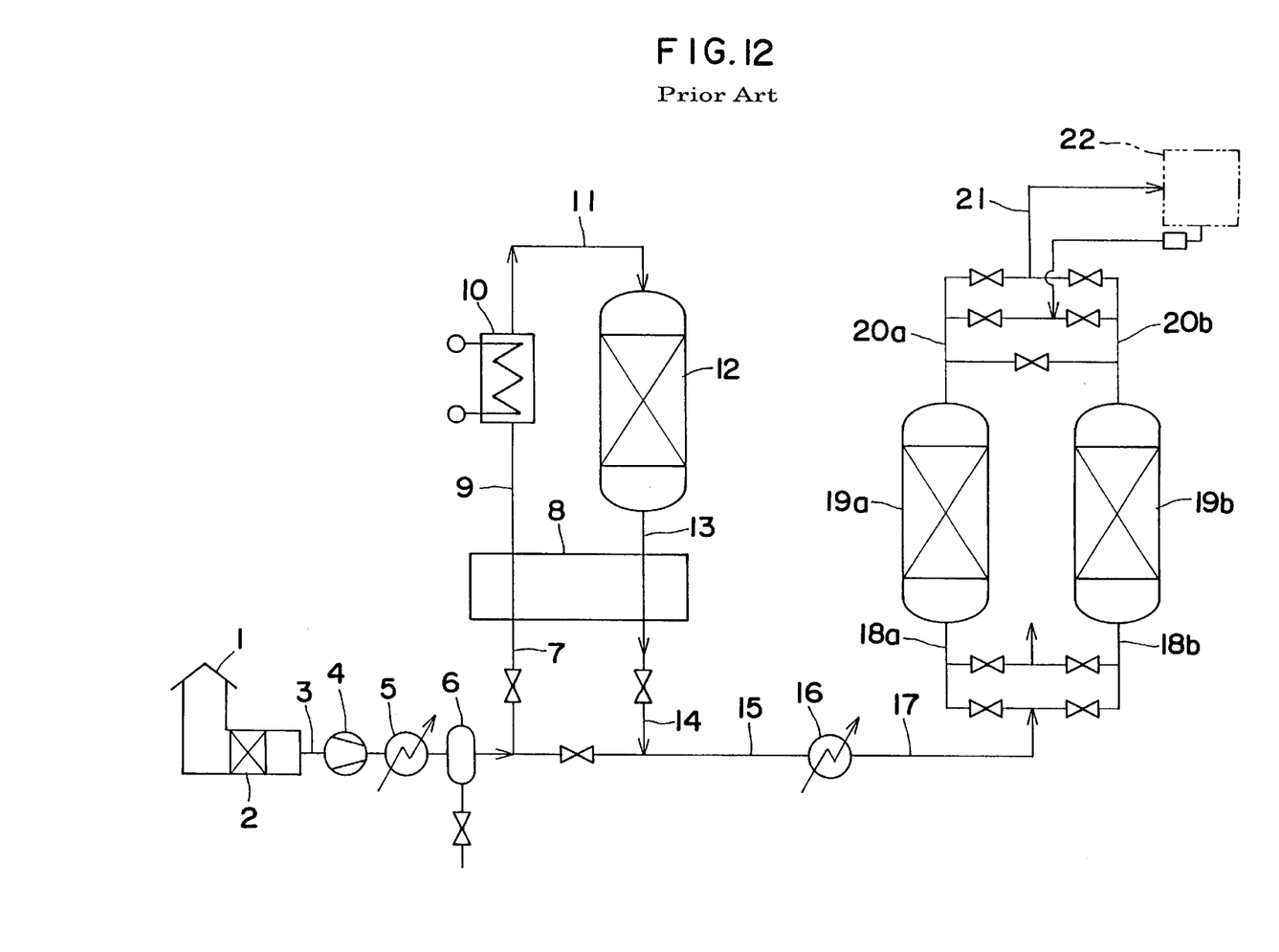
FIG. 12 is a system chart showing the gas purifying apparatus of the prior art.

Accordingly, as shown in FIG. 12, raw air supplied to an air inlet 1 is introduced through a filter 2 and a passage 3 to an air compressor 4 to be compressed there, and the compressed raw air is fed through an after-cooler 5 and a water separator 6 and further through a passage 7 to a preheater 8 which is a heat exchanger and then introduced through a passage 9 to a heater 10 to be heated there. The thus treated raw air is introduced through a passage 11 to a catalyst column 12 where it is brought into contact with a carbon monoxide oxidizing catalyst and a hydrogen oxidizing catalyst to effect reaction with the oxygen contained in the air and to convert carbon monoxide and hydrogen into carbon dioxide and water respectively. The compressed air which contained carbon dioxide and water is then introduced through a passage 13 to the preheater 8 where their temperatures are lowered, and after they are introduced through passages 14 and 15 to a cooler 16 and cooled therein, they are further introduced through a passage 17 and through either a passage 18a or 18b to either an adsorption unit 19a or an adsorption unit 19b where carbon dioxide and water contained originally in the raw air supplied are adsorbed and removed, by an adsorbent packed in the adsorption unit 19a or that in the unit 19b, together with the carbon dioxide and water formed by catalytic oxidation. The raw air thus purified is designed to be supplied through either a passage 20a or a passage 20b and through a passage 21 to an air separation plant 22.

In the case where. a catalyst layer is incorporated in the system as shown in FIG. 12, the atmospheric air is brought into contact with the catalyst without going through any purifying means, so that the catalyst is deteriorated by catalyst poisons such as sulfur oxides contained in the atmospheric air. Accordingly, catalysts are used under heating as a measure for maintaining the catalytic activity. However, this requires electric power for heating a large amount of air, and even if the heat quantity required is reduced by heat recovery, a large heat exchanger is necessary for the recovery.

Meanwhile, in order to minimize the influence of catalyst poisons, it can be expected to install an adsorption unit for adsorbing and removing carbon dioxide and water contained originally in the air on the upstream side of the catalyst layer for catalyzing oxidation of carbon monoxide and/or hydrogen. According to this procedure, many catalyst poison can be removed by the purification action of the adsorbent, and the life of the catalyst can be improved. However, in this case, an extra adsorbent layer for adsorbing and removing carbon dioxide formed by oxidation of carbon monoxide and water formed by oxidation of hydrogen must be incorporated on the downstream side of the catalyst layer, requiring a high facility cost.

There are an affluence of literatures on oxidation catalysts for carbon monoxide and hydrogen describing a number of useful catalysts (e.g., Y. Murakami's, "SHOKUBAI REKKA MEKANIZUMU TO BOSHI TAISAKU (Catalyst Deterioration Mechanism and Its Prevention)", published by Gijutsu-Joho Kyokai, 1995). In these literatures, there are general descriptions of the deterioration of catalysts (reduction in the catalytic activities), but there is found no literature describing deterioration of catalysts in removing very small amount of carbon monoxide and hydrogen contained in the atmospheric air as is discussed in the present invention.

Under the present circumstances, catalysts are maintained at high temperatures of 100° C. or higher in the conventional gas purifying apparatuses so as to maintain their activities based on the general consideration on catalytic reactions. However, in order to reduce electric power consumption rate in cryogenic separation of air, it is economically disadvantageous to heat a large amount of air as described above, and there has been expected an advent of catalysts having high activities of oxidizing carbon monoxide and/or hydrogen in the temperature range of about 5 to 50° C. and an apparatus enabling extended use of catalysts without deterioration.

OBJECT AND SUMMARY OF THE INVENTION

It is an objective of the invention to provide a gas purification-treating agent and a gas purifying apparatus which can remove carbon monoxide and/or hydrogen from a gas employing no special equipment.

Another objective of the invention is to provide a gas purifying apparatus realizing simplification of the conventional intricate pretreatment purification procedures including removal of carbon dioxide and water from a gas having passed through a carbon monoxide/hydrogen removing catalyst column, and downsizing of the apparatus.

The gas purification-treating agent and gas purifying apparatus for removing carbon monoxide and/or hydrogen contained in a gas according to the present invention are of the following constitutions and actions.

A first aspect of the present invention is a gas purification-treating agent for treating carbon monoxide and/or hydrogen contained in a gas in the presence of oxygen, and the agent consists of an adsorbent having carbon dioxide and/or water adsorptivity, and a metal or metal compound, carried thereon, which activates oxidation reaction of carbon monoxide and/or hydrogen. The adsorbent adsorbs carbon dioxide and/or water contained originally in the gas, as well as, carbon dioxide and/or water to be formed by the oxidation reaction of carbon monoxide and/or hydrogen. By subjecting the gas to purification treatment with this gas purification-treating agent, the carbon monoxide and/or hydrogen contained in the gas are/is oxidized in the presence of oxygen by the metal or metal compound which activates the oxidation reaction of carbon monoxide and/or hydrogen to convert them/it into carbon dioxide and/or water, respectively, and the carbon dioxide and/or water obtained by the oxidation treatment are/is adsorbed and removed by the adsorbent carrying the metal or metal compound thereon. Simultaneously, the carbon dioxide and/or water contained originally in the gas are/is also adsorbed and removed by the adsorbent.

A second aspect of the invention is that the gas purification-treating agent consists of an adsorbent having excellent water adsorptivity, and at least one of an Au-on-metal oxide, an Au-on-metal hydroxide and an Au colloidal powder carried thereon. When a gas containing carbon monoxide and/or hydrogen is to be purified using this gas purification-treating agent in the presence of oxygen, the reaction and treatment can be carried out at a relatively low temperature in the range of 0 to 100° C., preferably 0 to 50° C. Simultaneously, the carbon dioxide and/or water contained originally in the gas can also be adsorbed and removed. The adsorbent having excellent water adsorptivity includes, for example, activated alumina and silica gel.

A third aspect of the invention is that the gas purification-treating agent consists of an adsorbent having carbon dioxide adsorptivity and water adsorptivity, and at least one of an Au-on-metal oxide, an Au-on-metal hydroxide and an Au colloidal powder carried thereon. When a gas containing carbon monoxide and/or hydrogen is to be purified using this gas purification-treating agent in the presence of oxygen, the reaction and treatment can be carried out at a relatively low temperature in the range of 0 to 100° C., preferably 0 to 50° C. Simultaneously, the carbon dioxide and/or water contained originally in the gas can also be adsorbed and removed. The adsorbent having carbon dioxide adsorptivity and water adsorptivity includes, for example, various types of zeolites, and there is preferably selected Na-X type, Ca-A type or Ca-X type zeolite having preferably a $CO_2$ equilibrium amount adsorbed of 0.3 mmol/g or more under a $CO_2$ partial pressure of 0.25 kPa and at a temperature of 20° C.

A fourth aspect of the invention is that the Au-on-metal oxide is at least one of $Au/\alpha\text{-}Fe_2O_3$, $Au/TiO_2$, $Au/SnO_2$, $AuZnO_2$, $Au/Co_3O_4$, $Au/NiO$, $Au/InO_2$ and $Au/NiFeO_4$; whereas the Au-on-metal hydroxide is at least one of $Au/Mg(OH)_2$ and $Au/Be(OH)_2$. These oxides and hydroxides cause oxidation reaction of carbon monoxide and/or hydrogen to take place in the presence of oxygen at a relatively low temperature in the range of 0 to 100° C.

A fifth aspect of the invention is that the gas purification-treating agent consists of an adsorbent which is a porous carrier having excellent water adsorptivity, and palladium and/or platinum carried thereon. When a gas containing carbon monoxide and/or hydrogen is to be purified using this gas purification-treating agent in the presence of oxygen, the reaction and treatment can be carried out at a relatively low temperature in the range of 0 to 50° C. Simultaneously, the carbon dioxide and/or water contained originally in the gas can also be adsorbed and removed. The adsorbent having excellent water adsorptivity includes, for example, activated alumina and silica gel.

A sixth aspect of the invention is that the gas purification-treating agent consists of an adsorbent having carbon dioxide adsorptivity and water adsorptivity, and palladium and/or platinum carried thereon. When a gas containing carbon monoxide and/or hydrogen is to be purified using this gas purification-treating agent in the presence of oxygen, the reaction and treatment can be carried out at a relatively low temperature in the range of 0 to 50° C. Simultaneously, the carbon dioxide and/or water contained originally in the gas can also be adsorbed and removed. The adsorbent having excellent carbon dioxide adsorptivity and water adsorptivity includes, for example, various types of zeolites, as given referring to the third aspect of the invention.

A seventh aspect of the invention is a gas purifying apparatus for removing carbon monoxide and/or hydrogen contained in a gas, provided with a container having a gas inlet and a gas outlet and packed with a treating agent consisting of an adsorbent for adsorbing carbon dioxide and water, and a metal or metal oxide, carried thereon, for effecting oxidation treatment of carbon monoxide and/or hydrogen in the presence of oxygen. Accordingly, the carbon monoxide and/or hydrogen contained in the gas introduced through the gas inlet into the container are/is oxidized with the aid of the metal catalyst in the presence of oxygen to be converted into carbon dioxide and/or water, which are/is then adsorbed and removed by the adsorbent carrying thereon the catalyst metal (a metal or metal compound which activates oxidation reaction of carbon monoxide and/or hydrogen; the same shall apply hereinafter). The thus treated gas is delivered as a purified gas from the gas outlet of the container. Incidentally, when the gas contains originally carbon dioxide and/or water, they are also adsorbed and removed by the adsorbent carrying thereon the catalyst metal.

An eighth aspect of the invention is a gas purifying apparatus for removing carbon monoxide and/or hydrogen contained in a gas, and the apparatus contains a first treating agent layer consisting of an adsorbent having excellent water adsorptivity, and a metal or metal compound, carried on the adsorbent, for effecting oxidation treatment of carbon monoxide and/or hydrogen in the presence of oxygen; and a second treating agent layer containing a treating agent consisting of an adsorbent having carbon dioxide adsorptivity and a metal or metal compound, carried thereon, for effecting oxidation treatment of carbon monoxide and/or hydrogen in the presence of oxygen; This adsorbent may of course have water adsorptivity additionally. The first and second treating agent layers being packed in a container having a gas inlet and a gas outlet in this order in terms of the gas flow. Accordingly, carbon monoxide and/or hydrogen contained in the gas introduced through the gas inlet into the container are/is oxidized in the presence of oxygen by the metal catalyst of the first treating agent layer to be converted into carbon monoxide and/or water. The water formed by the oxidation treatment, as well as, the water contained originally in the gas are first adsorbed and removed by the water adsorbent carrying the metal catalyst thereon, and then the carbon dioxide formed by the oxidation treatment, as well as, the carbon dioxide contained originally in the gas are adsorbed and removed by the carbon dioxide adsorbent carrying the metal oxide thereon in the second treating agent layer. The thus treated gas is delivered as a purified gas through the gas outlet of the container.

A ninth aspect of the invention is a gas purifying apparatus for removing carbon monoxide and/or hydrogen contained in a gas, and the apparatus contains a first adsorbent layer containing an adsorbent for removing water contained in the gas; a second adsorbent layer containing an adsorbent for removing carbon dioxide contained in the gas; and a treating agent layer containing a treating agent consisting of an adsorbent having carbon dioxide and/or water adsorptivity, and a metal or metal compound, carried on the adsorbent, for effecting oxidation treatment of carbon monoxide and/or hydrogen in the presence of oxygen; the first and second adsorbent layers and the treating agent layer being packed in a container having a gas inlet and a gas outlet in this order in terms of the gas flow. Accordingly, when a raw gas containing carbon monoxide and/or hydrogen is introduced into the first adsorbent layer, water if contained originally in the gas is adsorbed and removed in the first adsorbent layer and then introduced into the second adsorbent layer where carbon dioxide if contained originally in the raw gas is adsorbed and removed. The thus treated gas is introduced into the treating agent layer where carbon monoxide and/or hydrogen contained therein are/is oxidized in the presence of oxygen by the metal catalyst to be converted into carbon dioxide and/or water which are/is adsorbed and removed by the adsorbent carrying the catalyst metal thereon, and the thus treated gas is delivered as a purified gas. In this case, even if water and carbon dioxide failed to be adsorbed and removed in the first adsorbent layer and in the second adsorbent layer respectively, they are adsorbed and removed together with the carbon dioxide and/or water formed by the oxidation treatment in the treating agent layer containing the adsorbent carrying the catalyst metal thereon.

Incidentally, the adsorbent to be packed for forming the first adsorbent layer for adsorbing and removing water includes activated alumina, silica gel, etc.; whereas the adsorbent to be packed for forming the second adsorbent layer for removing carbon dioxide includes various types of zeolites and can be selected from those as used in the third aspect. Meanwhile, the treating agent consisting of an adsorbent carrying a catalyst metal thereon and constituting the treating agent layer is at least one of the treating agents as described in the first to sixth aspects.

A tenth aspect of the invention is a gas purifying apparatus for removing carbon monoxide and/or hydrogen contained in a gas, and the apparatus contains a first adsorbent layer containing an adsorbent for removing water contained in the gas, a second adsorbent layer containing an adsorbent for removing carbon dioxide contained in the gas; and a treating agent layer containing a mixture of a plurality of treating agents each consisting of an adsorbent having carbon dioxide and/or water adsorptivity, and a metal or metal compound, carried on the adsorbent, for effecting oxidation treatment of carbon monoxide and/or hydrogen in the presence of oxygen; the first and second adsorbent layers and the treating agent layer being packed in a container having a gas inlet and a gas outlet in this order in terms of the gas flow. Accordingly, when a raw gas containing carbon monoxide and/or hydrogen is introduced into the first adsorbent layer, water if contained originally in the gas is adsorbed and removed in the first adsorbent layer and then introduced into the second adsorbent layer where carbon dioxide if contained originally in the raw gas is adsorbed and removed. The thus treated gas is introduced into the treating agent layer where carbon monoxide and/or hydrogen contained therein are/is oxidized in the presence of oxygen by the metal catalyst to be converted into carbon dioxide and/or water which are/is adsorbed and removed by the adsorbent carrying the catalyst metal thereon. In this case, since the treating agent layer is of a mixture of a plurality of treating agents, it can securely provide a temperature range where the catalytic reactions take place stably.

Generally, in adsorption units for removing carbon dioxide and water contained in raw air, which are installed as pretreating units for air separation plants, in many cases, activated alumina, silica gel, etc. are packed on the raw air inlet side as adsorbents (driers) for adsorbing and removing water contained in the raw air; while zeolite is packed on the raw gas outlet side as an adsorbent for adsorbing and removing carbon dioxide. Accordingly, while the carbon monoxide and/or hydrogen treating agent layer may be located at any position on the downstream side (in terms of the gas flow) of the water adsorbent, the present inventors clarified in order to make the most of the performance of the carbon monoxide and/or hydrogen treating agent that a stable effect can be obtained in a specific temperature range if the treating agent layer is located on the downstream side of the carbon dioxide adsorbent, or if the water removing adsorbent layer, the carbon dioxide removing adsorbent layer, and the carbon monoxide and/or hydrogen treating agent layer are arranged in this order.

Further, in the eighth, ninth and tenth aspects described above, while it is desirable to pack each adsorbent layer and each treating agent layer separately layerwise in a single container having a gas inlet and a gas outlet in view of curtailment of facility cost, they may be packed into a plurality of containers each having a gas inlet and a gas outlet and arranged in series in the above-described orders respectively. Such constitutions are of course included in the present invention.

An eleventh aspect of the invention is a gas purifying apparatus for removing carbon monoxide and/or hydrogen contained in a gas, and the apparatus contains an adsorbent layer containing an adsorbent for adsorbing and removing water contained in the gas; and a treating agent layer containing a mixture of an adsorbent for adsorbing and removing carbon dioxide contained in the gas and a treating agent consisting of an adsorbent for adsorbing and removing carbon dioxide, and a metal or metal compound, carried on the adsorbent, for effecting oxidation treatment of carbon monoxide and/or hydrogen in the presence of oxygen; the adsorbent layer and the treating agent layer being packed in a container having a gas inlet and a gas outlet in this order in terms of the gas flow. This is the case where a mixture of the carbon dioxide adsorbent layer and the catalyst-containing treating agent layer in the ninth or tenth aspect is packed into the columns and is employed in view of the low cost compared with the case where the respective layers are packed into different containers, ease of packing procedures, etc.

Further, in the ninth and tenth aspects described above, a water and carbon dioxide adsorbent may be admixed to the treating agent layer. In the eleventh aspect, a water adsorbent may be admixed to the treating agent layer. Incidentally, the seventh to eleventh aspects are suitable for achieving purification of a gas containing carbon monoxide and/or hydrogen in a concentration on the order of ppm or less.

Meanwhile, the eighth to eleventh aspects are most suitable for achieving purification of raw air to be supplied to air separation plants.

Further, in the oxidation treatment of carbon monoxide and/or hydrogen, the oxygen contained originally in the raw gas and/or oxygen added separately are/is used.

A twelfth aspect of the invention is a gas purifying apparatus according to any of the seventh to eleventh aspects, wherein the carbon monoxide and/or hydrogen treating agent consists of an adsorbent of a porous carrier having excellent water adsorptivity, and palladium and/or platinum carried thereon. This treating agent can suitably be employed in the seventh to eleventh aspects of the present invention.

A thirteenth aspect of the invention is a gas purifying apparatus according to any of the seventh to eleventh aspects, wherein the carbon monoxide and/or hydrogen treating agent consists of an adsorbent having carbon dioxide adsorptivity and water adsorptivity, and palladium and/or platinum carried thereon. This treating agent can suitably be employed in the seventh to eleventh aspects of the present invention.

A fourteenth aspect of the invention is a gas purifying apparatus according to any of the seventh to eleventh aspects, wherein the carbon monoxide and/or hydrogen treating agent consists of an adsorbent having carbon dioxide and/or water adsorptivity, and $Au/\alpha\text{-}Fe_2O_3$ and/or an Au colloidal powder carried thereon. This treating agent can suitably be employed in the seventh to eleventh aspects of the present invention.

According to the present invention, carbon monoxide and/or hydrogen can be removed efficiently with no heating procedures and the like for enhancing the activity of carbon monoxide and/or hydrogen. The gas purification-treating agent and gas purifying apparatuses described above are most suitably employed in and as a pretreating purifying apparatus for an air separation plant for producing extremely high-purity nitrogen gas to be employed in semiconductor industries and the like. That is, carbon monoxide and/or hydrogen contained in air can be removed using substantially the same apparatus as the conventional pretreating apparatus for removing carbon dioxide and water and with substantially the same operation procedures.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments taken in conjunction with the attached drawings in which:

DETAILED DESCRIPTION OF THE PREFERRED EMBODIMENTS

A typical example of the gas purification-treating agent according to one embodiment of the present invention consists of an activated alumina carrier and Au-on-di-iron tri-oxide carried thereon. The amount of gold to be carried on the alumina is 0.3 to 0.5% by weight based on the total weight of the treating agent. The treating agent prepared according to the coprecipitation method (to be described later) has an extremely excellent property in that it causes a carbon monoxide oxidation reaction and a hydrogen oxidation reaction at a temperature of 0° C. and at a temperature of 50° C. or lower respectively.

As a process for preparing an Au-on-metal oxide or Au-on-metal hydroxide catalyst according to the first to fourth aspects, there were employed those which are known conventionally, and each metal oxide or metal hydroxide thus prepared was allowed to be carried on an adsorbent such as alumina, silica gel and zeolite by conventional procedures, followed by deposition of gold on the metal oxide or metal hydroxide by means of coprecipitation, magnesium citrate addition method, dropping deposition on carrier method, etc. and then calcination of the resulting product under atmospheric condition to prepare Au-on-metal microparticles.

As a process for preparing an Au-on-metal, there are known, for example, the aqueous metal chloride ($HAuCl_4$) impregnation method, the coprecipitation method, the magnesium citrate addition method and dropping deposition on carrier method. The present inventors prepared the treating agents described in the first to fourth aspects by employing suitable combinations of carriers and metal compounds and by selecting the coprecipitation method, the magnesium citrate addition method or the dropping deposition on carrier method.

To describe, for example, a process for producing the gas purification treating agent according to this embodiment employing the dropping deposition on carrier method, a bead carrier impregnated with a metal oxide was used as the carrier, and after the metal oxide molded body carried thereon was immersed in a fixed-pH aqueous solution prepared beforehand, aqueous chloroauric acid ($HAuCl_4$) and aqueous sodium carbonate were added thereto dropwise to effect deposition of gold hydroxide on the molded body, followed by rinsing with water, drying and calcination under free air.

To describe a process for producing the gas purification-treating agent of this embodiment according to the coprecipitation method, a mixed aqueous solution of chloroauric acid ($HAuCl_4$) and a metal nitrate was added to aqueous sodium carbonate, and a coprecipitate thus obtained was rinsed with water, dried and calcined under free air.

To describe the gas purification-treating agent of this embodiment according to the magnesium citrate addition method, magnesium citrate [$Mg_3(C_3O_5H_7)_2$] was added to an aqueous chloroauric acid ($HAuCl_4$) solution containing a metal oxide powder suspended therein prepared beforehand, and the resulting mixture was aged, rinsed with water and dried, followed by calcination under free air.

It is known that Au-on-metal oxide and Au-on-metal hydroxide catalysts show properties of effecting oxidation reactions particularly against carbon monoxide at a very low temperature and under moisture-rich conditions. Accordingly, these catalysts are extremely suitable for reacting and removing carbon monoxide in the atmospheric air (normal temperature, saturated water content). Since Au-on-metal oxide and Au-on-metal hydroxide catalysts also effect oxidation reaction of hydrogen at around normal temperature, they are also suitable for reacting and removing hydrogen contained in the atmospheric air (normal temperature, saturated water content). Since Au-on-metal oxide and Au-on-metal hydroxide catalysts are each carried on an adsorbent and they effect not only oxidation of carbon monoxide to form carbon dioxide but also adsorption and removal of the carbon dioxide thus formed as described above, as well as, oxidation of hydrogen to form water and adsorption and removal of the water thus formed, they are extremely suitably employed for removing impurities contained in air. Use of such catalysts (treating agent) particularly for a pretreating apparatus for an air separation plant enables simplification of the plant and of operations and downsizing of the plant.

The adsorbent having carbon dioxide adsorptivity to be employed here as the carrier may be selected from the various types of zeolites described above, activated carbon or activated alumina, and particularly preferably zeolite of, for example, Na-X type, Ca-A type or Ca-X is selected. Further, Ni-X type, Sr-X type, Li-X type or Ag-X type zeolite may be employed, and also these zeolites may be subjected to ion exchange treatment with various metals. Meanwhile, the adsorbent having carbon dioxide adsorptivity to be employed as the carrier preferably has a $CO_2$ equilibrium adsorption of 0.3 mmol/g or more under a $CO_2$ partial pressure of 0.25 kPa and at a temperature of 20° C. Further, the porous carrier particularly preferably has water adsorptivity and is selected from activated alumina, silica gel, etc.

Figure 1:
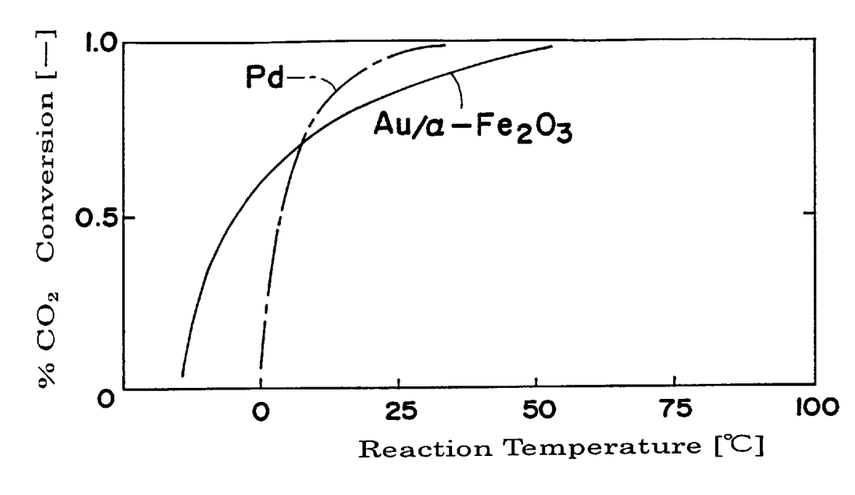
FIG. 1 is a chart showing graphically measurement results of % conversion of carbon monoxide to carbon dioxide in the presence of a palladium catalyst and an $Au/\alpha\text{-}Fe_2O_3$ respectively.
Figure 2:
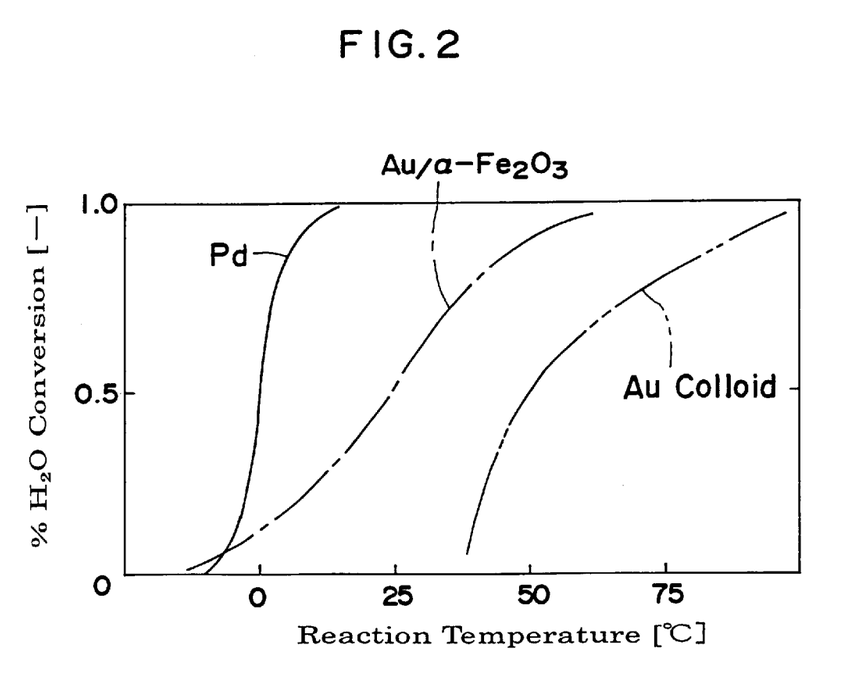
FIG. 2 is a chart showing graphically measurement results of % conversion of hydrogen to water in the presence of a $Pd/Al_2O_3$ catalyst, an $Au/\alpha\text{-}Fe_2O_3$ catalyst and an Au colloidal catalyst respectively.

The carbon monoxide and/or hydrogen treating agents exemplified in the fourth to sixth aspects have high activities of oxidizing carbon monoxide and hydrogen particularly at around normal temperature and have an inclination to show enhanced activities at higher reaction temperatures. For example, measurement results of % conversion of carbon monoxide into carbon dioxide when palladium and Au/$\alpha$-$Fe_2O_3$ were employed respectively are shown in FIG. 1. Meanwhile, measurement results of % conversion of hydrogen into water when Pd/$Al_2O_3$, Au/$\alpha$-$Fe_2O_3$ and Au colloid were employed respectively are shown in FIG. 2.

Further, it is known that high activities of oxidizing carbon monoxide and hydrogen are exhibited at around normal temperature, when the Au-on-metal oxide is Au/$\alpha$-$Fe_2O_3$, Au/$TiO_2$, Au/$SnO_2$, Au$ZnO_2$, Au/$Co_3O_4$, Au/NiO, Au/$InO_2$ or Au/$NiFeO_4$ and when the Au-on-metal hydroxide is Au/$Mg(OH)_2$ or Au/$Be(OH)_2$ (Y. Murakamil's, "SHOKUBAI REKKA MEKANIZUMU TO BOSHI TAISAKU (Catalyst Deterioration Mechanism and Its Prevention)", published by Gijutsu-Joho Kyokaip, pp. 97–108).

In addition, the temperature of the gas to be treated is increased by the heat of adsorption and the heat of reaction, so that even if a gas having a low temperature of, for example, 5 to 50° C. is introduced into a container, the gas can be heated to a temperature sufficient for the catalytic reaction to take place, e.g. to about 80° C. Therefore, according to the present invention, hydrogen and carbon monoxide contained in the gas can be removed substantially completely in the gas purifying apparatuses according to the seventh to fourteenth aspects.

The treating agents consisting of palladium and/or platinum-on-activated alumina, -silica gel or the like in the fifth and sixth aspects were prepared according to the ordinary catalyst manufacturing process. Palladium, when employed as a catalyst, accelerates the oxidation reactions of carbon monoxide and of hydrogen in a temperature range of 0 to 25° C. and in a temperature range of −10 to 10° C., respectively, as shown in FIGS. 1 and 2.

The gas purifying apparat uses described in the seventh to fourteenth aspects employ the treating agents of the first to sixth aspects. The gas purifying apparatuses of the present invention are presupposed to be operated in the same manner as the conventional carbon dioxide and water adsorption units are.

More specifically, as the adsorption-desorption system, either normal temperature adsorption heated desorption method (so-called TSA method) or high pressure adsorption low pressure desorption (so-called PSA method) can be employed. Further, various conditions including the number of treatment columns employed, adsorption-regeneration switching time, adsorption temperature, adsorption pressure, regeneration temperature, regeneration pressure, etc. are set precisely on the premise that carbon dioxide and water are to be adsorbed. To repeat the regeneration/adsorption operations sequentially per predetermined time is essential not only for the carbon dioxide/water adsorbent for regeneration thereof but also for the carbon monoxide and/or hydrogen treating agent for desorption of carbon dioxide and/or water adsorbed thereon and for restoration of its catalytic activity. That is, in a regeneration step, the surface of the catalyst is swept over by a large amount of regeneration purge gas to provide an opportunity where catalyst poisons deposited on the surface of the catalyst are removed by the purge gas. Particularly in the heat regeneration method, as described above, since the carbon monoxide and/or hydrogen treating agent are/is located relatively near the regeneration purge gas inflow end, sufficient heating of the treating agent brings about a further increased effect of removing catalyst poisons deposited on the surface of the catalyst.

As a matter of course, the gas purifying apparatus according to the present invention carries out removal of carbon monoxide and hydrogen simultaneously, and if the carbon monoxide removing agent or the hydrogen removing agent is used singly, either carbon monoxide or hydrogen can be removed respectively.

Embodiments of the gas purifying apparatus according to the present invention will be described more specifically referring to FIGS. 3, 4, 5 and 6. FIGS. 3, 4, 5 and 6 each are a system chart showing different embodiments of pretreating apparatuses for an air separation plant, respectively.

The gas purifying apparatus of the seventh aspect will be described referring to the first embodiment shown in FIG. 3. An air inlet 31 containing a filter 32 communicates via a passage 33 with an air compressor 34 which communicates further via a passage 35 with a cooler 36. The cooler 36 has on the outlet side a water separator 37 which removes the extra water over saturation from the compressed and cooled gas. The water separator 37 is connected on the outlet side to a passage 38 which is branched into raw air inlet passages 40a and 40b having inlet valves 39a and 39b and connected to treatment columns 41a and 41b, respectively. Purified air outlet passages 43a and 43b having outlet valves 42a and 42b connected to the outlet sides of the treatment columns 41a and 41b, respectively, are combined into a purified air outlet passage 44, through which purified air is supplied to an air separation plant 45.

Meanwhile, a regeneration gas inlet passage 47 having a heater 46 branches into regeneration gas inlet passages 49a and 49b having regeneration gas inlet valves 48a and 48b to communicate with the upstream sides (in terms of purified gas flow) of the outlet valves 42a and 42b of the purified air outlet passages 43a and 43b, respectively. Regeneration gas outlet passages 51a and 51b having regeneration gas outlet valves 50a and 50b communicating with the downstream sides of the inlet valves 39a and 39b of the raw air inlet passages 40a and 40b respectively combines into a regeneration gas delivery passage 52. Further, the outlet valves 42a and 42b of the purified air outlet passages 43a and 43b communicate on the upstream sides (in terms of gas flow) with a pressurization passage 54 having a repressurization valve 53.

Containers 57 of the treatment columns 41a and 41b each having a gas inlet 55 and a gas outlet 56 are packed with a treating agent 58 consisting of an adsorbent for adsorbing carbon dioxide and water, e.g. zeolite, and a metal such as Au/α-$Fe_2O_3$ for oxidizing carbon monoxide and hydrogen in the presence of oxygen carried thereon.

Next, air purification process to be carried out in the gas purifying apparatus will be described. The raw air introduced through the air inlet 31 is introduced through the filter 32 and the passage 33 into the air compressor 34 where it is compressed to about 5 to 10 kg/$cm^2$G. The thus compressed raw air is introduced through the passage 35 into the cooler 36 where it is cooled to a temperature of about 5 to 50° C., and then the water of condensation is separated by the water separator 37 to allow the water content of the gas to be the saturated vapor pressure. The resulting raw air is introduced through the passage 38 and through the gas inlet 55 to one treatment column which is in the treatment step (e.g., to the treatment column 41a through the raw air inlet passage 40a having the inlet valve 39a which is opened).

The compressed air introduced into the treatment column 41a is brought into contact with the metal catalyst carried on the adsorbent of the treating agent 58, and carbon monoxide and/or hydrogen contained in the compressed air are/is oxidized by the oxygen contained therein to be converted into carbon dioxide and water. The thus formed carbon dioxide and water are adsorbed immediately, together with the carbon dioxide and water contained originally as impurities in the raw air, by the adsorbent of the treating agent 58, and the resulting purified air is fed out of the gas outlet 56 and through the purified air outlet passage 43a having the outlet valve 42a and through the purified air outlet passage 44 to the air separation plant 45.

Further, during purification of the compressed air in the treatment column 41a, the regeneration step for removing impurities adsorbed on the treating agent 58 is carried out in the other treatment column 41b. More specifically, after the regeneration gas outlet valve 50b is opened to allow the internal pressure of the treatment column 41b to be open to the atmospheric pressure via the regeneration gas outlet passage 51b and the regeneration gas delivery passage 52, the regeneration gas inlet valve 48b is opened and a regeneration gas, e.g. a part of the purified air, is fed through the regeneration gas inlet passage 47 into the heater 46 where it is heated to about 150° C. The heated gas is then introduced through the regeneration gas inlet passage 49b and through the gas outlet 56 into the treatment column 41b to effect regeneration of the treating agent 58 in the treatment column 41b.

The air used for the regeneration is exhausted to the atmosphere through the gas inlet 55, the raw air inlet passage 40b, the regeneration gas outlet passage 51b and the regeneration gas delivery passage 52. After heating of the treating agent by the regeneration gas for a predetermined time, the heater 46 is turned off to proceed with a cooling step.

When the internal temperature of the treatment column 41b is lowered to a predetermined temperature, the regeneration step is completed. Upon completion of the regeneration, the regeneration gas inlet valve 48b and the regeneration gas outlet valve 50b are closed, while the repressurization valve 53 is opened to introduce a part of the purified air fed out from the treatment column 41a to the treatment column 41b through the purified air outlet passage 43a, pressurization passage 54 and purified air outlet passage 43b and increase the internal pressure of the treatment column 41b. After completion of this pressurization, the repressurization valve 53 is closed. The inlet valve 39a and the outlet valve 42a are closed, while the inlet valve 39b and the outlet valve 42b are opened to introduce the compressed air into the treatment column 41b and to start purification treatment in the treatment column 41b where the purification treatment is carried out in the same manner as in the treatment column 41a to purify the compressed air and the purified air from the treatment column 41b is fed to the air separation plant 45 like in the case of column 41a. Meanwhile, in the treatment column 41a, the regeneration step is carried out in the same manner as described above. While the adsorption-desorption system in these treatment columns 41a and 41b was described here referring to the TSA method, the adsorption and desorption can be also carried out by the PSA method.

Next, the gas purifying apparatus of the eighth aspect will be described referring to the second embodiment shown in FIG. 4. It should be noted here that those parts and elements which are like in FIG. 3 are affixed with the same reference numbers respectively, and detailed description of their constitutions and actions will be omitted.

The containers 57 of treatment columns 41a and 41b each having a gas inlet 55 and a gas outlet 56 each contain a first treating agent layer 59 and a second treating agent layer 60 in this order in the direction of the flow of the gas to be treated. More specifically, in this embodiment, there are packed from the raw air inlet side toward the outlet side, an adsorbent having water adsorptivity (e.g. a treating agent consisting of activated alumina and a metal having oxidative activity, for example, Au/α-$Fe_2O_3$ carried thereon) and another treating agent consisting of an adsorbent having carbon dioxide and water adsorptivity (e.g., palladium-on-zeolite). This embodiment is of the case where consideration is taken on the arrangement of the treating agents to pack the Au/α-$Fe_2O_3$ catalyst which is hardly affected by the moisture on the inlet side of the column so that the reactions of removing hydrogen and carbon monoxide may be carried out simultaneously and efficiently with the removal of the saturated water content contained originally in the gas.

The gas purifying apparatuses of the ninth and tenth aspects will be described referring to the third embodiment shown in FIG. 5. It should be noted here that those parts and elements, which are like those in FIG. 3, are affixed with the same reference numbers respectively, and detailed description of their constitutions and actions will be omitted.

The containers 57 of treatment columns 41a and 41b each having a gas inlet 55 and a gas outlet 56 each contain a first adsorbent layer (e.g., an activated alumina layer) 61 containing an adsorbent for adsorbing and removing water contained in the compressed air, a second adsorbent layer (e.g., a zeolite layer) 62 containing an adsorbent for adsorbing and removing carbon dioxide contained in the compressed air and a treating agent layer 63 (consisting of an adsorbent for adsorbing carbon dioxide and/or water, and a metal or metal compound, carried on the adsorbent, for oxidizing carbon monoxide and/or hydrogen in the presence of oxygen). Incidentally, the treating agent layer 63 may contain a mixture of a plurality of treating agents.

Accordingly, when compressed air is introduced via a raw air inlet passage 40a and through a gas inlet 55 into the treatment column 41a, the water contained in the compressed air is first adsorbed and removed by the first adsorbent layer 61, and after the resulting compressed air is introduced to the second adsorbent layer 62 where carbon dioxide contained therein is adsorbed and removed, the air is introduced to the treating agent layer 63. While the compressed air passes through the adsorbent layers 61 and 62, traces of impurities contained in the compressed air including volatile hydrocarbons, halogen-containing hydrocarbons, organic sulfur compounds, sulfur oxides and nitrogen oxides which are detrimental to catalytic activities are adsorbed and removed in the adsorbent layers 61 and 62.

When the compressed air is introduced into the treating agent layer 63, it is brought into contact with the metal catalyst carried on the adsorbent of the treating agent of the treating agent layer 63, and carbon monoxide and hydrogen contained in the compressed air are oxidized by the reaction with oxygen contained therein to be converted into carbon dioxide and water. The thus formed carbon dioxide and water are adsorbed immediately, together with the residual water and impurities such as carbon dioxide contained originally in the raw air, by the adsorbent of the treating agent, and the resulting purified air is fed out of the gas outlet 56 and through the purified air outlet passage 43a and the purified air outlet passage 44 to the air separation plant 45.

To describe the process for obtaining purified air from a raw air in this embodiment, the raw air compressed by the air compressor is air-cooled or water-cooled to a suitable temperature (generally to 5 to 50° C.), and after the water of condensation is separated, the resulting raw air is introduced to the first adsorbent layer (e.g., an activated alumina layer) 61. The adsorbent of the first adsorbent layer 61 is a drier which adsorbs and removes the substantial part of water contained in the compressed air. The resulting air of highly dry state is introduced to the second adsorbent layer (e.g. a zeolite layer) 62. The dryness of the air is desirably −40° C. or lower in terms of dew point.

In the second adsorbent layer 62, carbon dioxide contained in the compressed air is adsorbed and removed to a trace concentration (about 1 ppm or less). Further, as described above, while the compressed air passes through the first and second adsorbent layers 61 and 62, traces of components contained in air including volatile hydrocarbons, halogen-containing hydrocarbons, organic sulfur compounds, sulfur oxides and nitrogen oxides which are detrimental to catalytic activities are adsorbed and removed to produce pure conditions for the catalyst.

The compressed air in which pure conditions for the catalyst are produced is introduced to the treating agent layer 63 for treating and removing carbon monoxide and hydrogen, where traces of carbon monoxide and hydrogen contained in the compressed air are reacted with the oxygen content in the compressed air under the catalytic actions of the metal for achieving oxidation treatment of carbon monoxide and hydrogen carried on the adsorbent for adsorbing carbon dioxide and/or water to be converted into carbon dioxide and water respectively. The thus formed carbon dioxide and water are adsorbed immediately by the carrier of the catalyst and are removed from the raw air.

In the case where a treating agent consisting of a carrier having carbon dioxide and water adsorptivity, and palladium and/or platinum carried as the catalyst thereon is used as the treating agent for removing carbon monoxide and hydrogen, carbon monoxide and hydrogen can be removed simultaneously using this treating agent singly. Meanwhile, in the case where a treating agent consisting of a carrier having carbon dioxide and water adsorptivity, and an Au-on-metal oxide or an Au-on-metal hydroxide carried as the catalyst thereon is used as the treating agent for removing carbon monoxide and hydrogen, these two components can be removed simultaneously using this treating agent singly. In these cases, the reaction of removing carbon monoxide and hydrogen and the removal of water and carbon dioxide contained originally in the raw gas, which is introduced into the apparatus at a temperature of 0 to 50° C., can be carried out in one step.

Meanwhile, in the cases where treating agents other than those described above are used as the treating agents for removing carbon monoxide, the above-described treating agent for removing hydrogen must be used in addition to the treating agent for removing carbon monoxide. In such cases, it is convenient in terms of workability to pack two different treating agents layerwise separately (fourth embodiment). However, the intended objective can be attained even if these two agents are mixed. The treating agents to be packed as the treating agent layer 63, when different treating agents are employed for removing carbon monoxide and hydrogen respectively, the carbon monoxide treating agent and the hydrogen treating agent are most desirably located on the upstream side and on the downstream side (in terms of the air flow), respectively, so that the water to be formed by oxidation of hydrogen may not affect the oxidation reaction of carbon monoxide.

The gas purifying apparatuses of the eleventh aspect will be described referring to the fourth embodiment shown in FIG. 6. The embodiment of FIG. 6 is a variation of the embodiment shown in FIG. 5. In this embodiment, the second adsorbent layer 62 and the treating agent layer 63 shown in FIG. 5 are combined to form an adsorbent-treating agent mixed layer 64 containing a mixture of a treating agent for treating carbon monoxide and hydrogen and an adsorbent for adsorbing and removing carbon dioxide, and this layer 64 is located subsequent to the adsorbent layer 61 for adsorbing and removing water contained in raw air.

In this embodiment, for example, when compressed air is introduced via the raw air inlet passage 40a and through the gas inlet 55 into the treatment column 41a, the water contained in the compressed air is first adsorbed and removed in the adsorbent layer 61, and the resulting compressed air is introduced to the adsorbent-treating agent mixed layer 64. While the compressed air passes through the adsorbent layer 61, traces of impurities contained in the compressed air including volatile hydrocarbons, halogen-containing hydrocarbons, organic sulfur compounds, sulfur oxides and nitrogen oxides which are detrimental to catalytic activities are adsorbed and removed in the adsorbent layer 61 in the same manner as described above. When the compressed air is introduced into the adsorbent-treating agent mixed layer 64, it is purified in the same manner as described above, and the resulting purified air is fed out of the gas outlet 56 and through the purified air outlet passage 43a and the purified air outlet passage 44 to the air separation plant 45.

The treating agent employable in the embodiments shown in FIGS. 3 to 6 includes, for example, an adsorbent having carbon dioxide and water adsorptivity, and palladium and/or platinum carried thereon, in addition to those described referring to the above embodiments. As the carrier for carrying palladium and/or platinum thereon is selected from various types of zeolites and activated alumina, particularly preferably Na-X type, Ca-A type or Ca-X type zeolite is selected which has preferably a $CO_2$ equilibrium adsorption of 0.3 mmol/g or more under a $CO_2$ partial pressure of 0.25 kPa and at a temperature of 20° C. Further, Ni-X type, Sr-X type, Li-X type or Ag-X type zeolite may be employed, and also these zeolites may be subjected to ion exchange treatment with various metals.

Meanwhile, as the treating agent, it is also preferred to use a combination of a carbon monoxide-removing treating agent consisting of an adsorbent having carbon dioxide adsorptivity and $Au/\alpha\text{-}Fe_2O_3$ carried thereon and a hydrogen-removing treating agent consisting of an adsorbent which is a porous carrier having excellent carbon dioxide adsorptivity and palladium and/or platinum carried thereon. In this case, while the carbon monoxide-removing treating agent and the hydrogen-removing treating agent may be mixed, it is more convenient in terms of workability to pack these two treating agents layerwise separately.

Further, as the water-removing carrier, one having excellent water adsorptivity is particularly preferred and is selected from activated alumina, silica gel, etc. Incidentally, in the case where either carbon monoxide or hydrogen is to be oxidation-treated, it is of course possible to use the relevant treating agent singly. Meanwhile, the adsorbent for adsorbing and removing water in the compressed air preferably includes a drier such as activated alumina; whereas the adsorbent for adsorbing and removing carbon dioxide in the compressed air includes preferably zeolite.

It should be noted here referring to the embodiments shown in FIGS. 3 to 6, the apparatuses are most useful for purifying raw air to be employed in air separation plants. However, the present invention is not to be limited to such application, but can be employed for purification of gases other than air. In the case where the gases other than air contain little or no oxygen to be utilized for oxidation treatment, oxygen may be added separately. Further, in the above embodiments, while the apparatuses each having two adsorption columns have been described, the present invention is not to be limited to such constitution, and the apparatus may have a single cylinder or three or more cylinders. When the apparatus has three or more adsorption columns, at least one of the columns may be in the treatment step.

Further, in the gas purifying apparatus of the this embodiment, it is effective in achieving adsorption and removal of carbon dioxide and/or water formed by oxidation of carbon monoxide and/or hydrogen to higher levels to dispose a carbon dioxide and/or water adsorbent layer (e.g., a zeolite layer) on the downstream side (in terms of the gas flow) of the treating agent layer for removing carbon monoxide and hydrogen. More specifically, the packing depth of the treating agent layer necessary for converting carbon monoxide into carbon dioxide or for converting hydrogen into water is not essentially equal to that of the carbon dioxide or water adsorbent layer necessary for adsorbing and removing carbon dioxide or water to a concentration level required in a cryogenic separation unit. Therefore, when the gist of the present invention is considered, the treating agent layer should be packed preferentially to the necessary depth in terms of the catalyst. It is effective to incorporate a carbon dioxide and/or water adsorbent layer to the downstream side of the catalyst (treating agent) layer so as to prevent small amounts of carbon dioxide and/or water which failed to be removed from flowing out into the cryogenic system.

In other words, in the embodiments shown in FIGS. 3 to 6, if a carbon dioxide and water adsorbent layer, for example, a zeolite layer is disposed on the downstream side (in terms of the air flow) of the carbon monoxide and hydrogen-removing treating agent 58 or treating agent layer 60, 63 or 64, carbon dioxide and water contained in the air, as well as, carbon dioxide and water formed by the oxidation treatment can be adsorbed and removed to higher levels.

Figure 4:
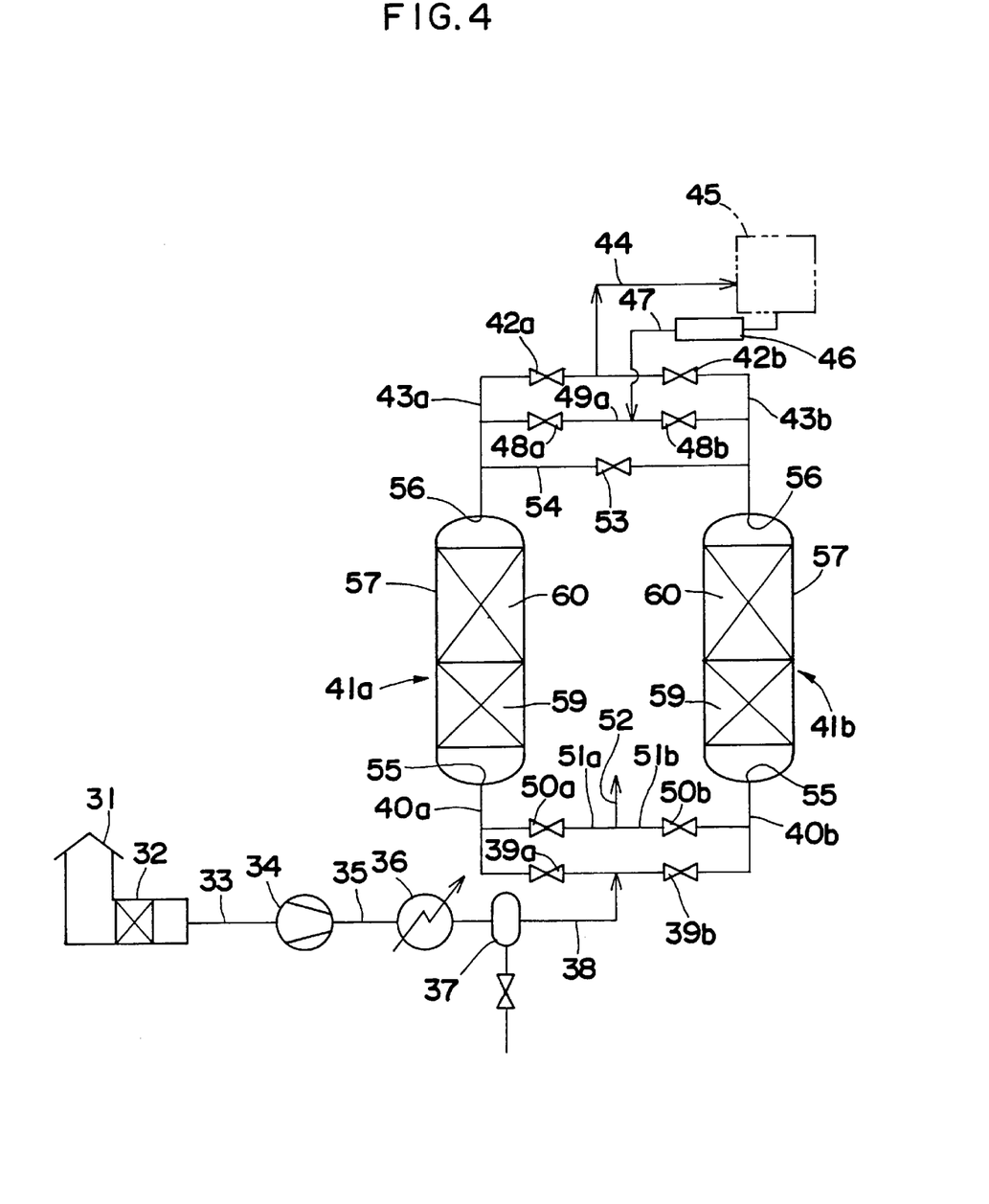
FIG. 4 is a system chart showing a gas purifying apparatus according to a second embodiment of the present invention.
Figure 5:
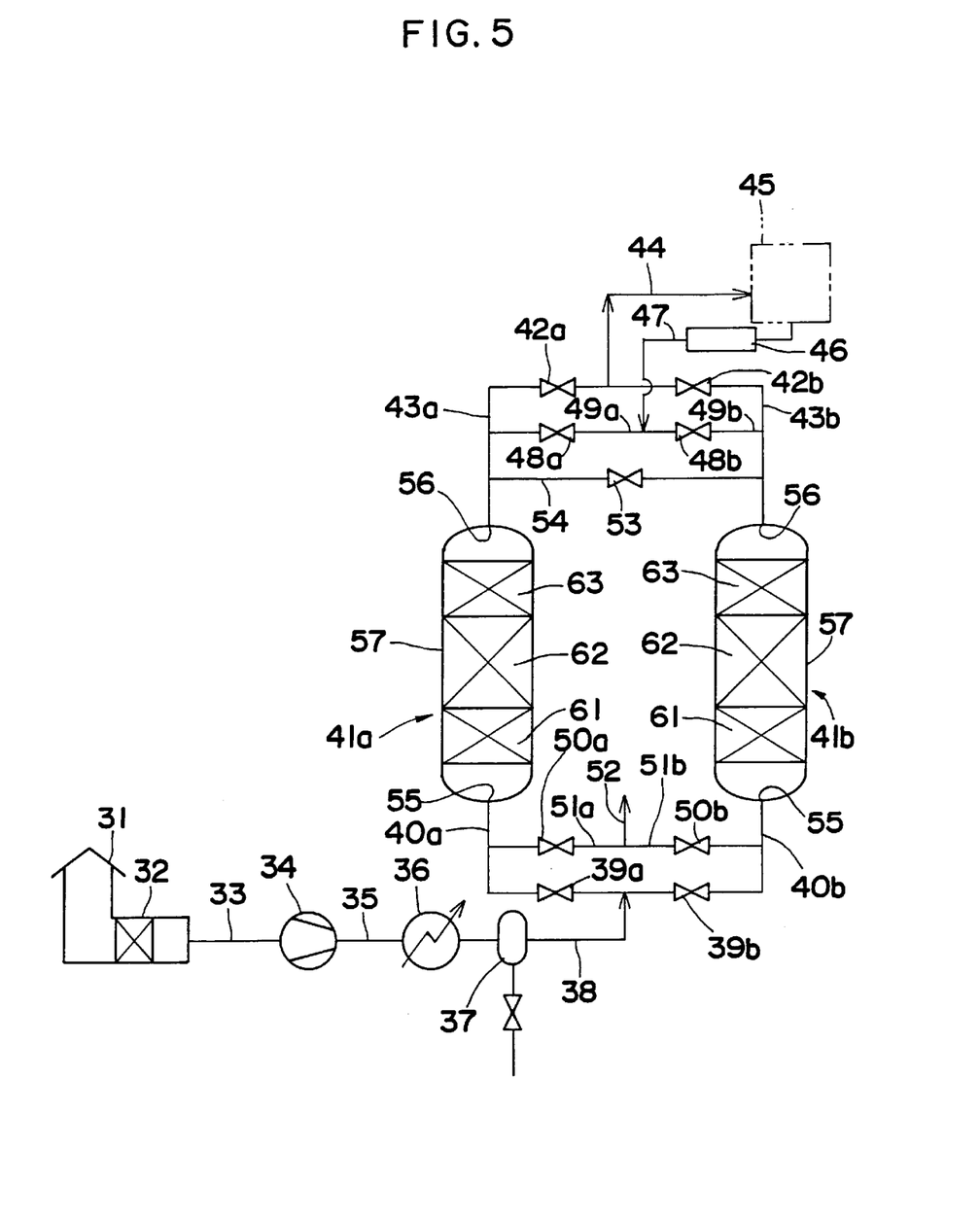
FIG. 5 is a system chart showing a gas purifying apparatus according to a third embodiment of the present invention.
Figure 6:
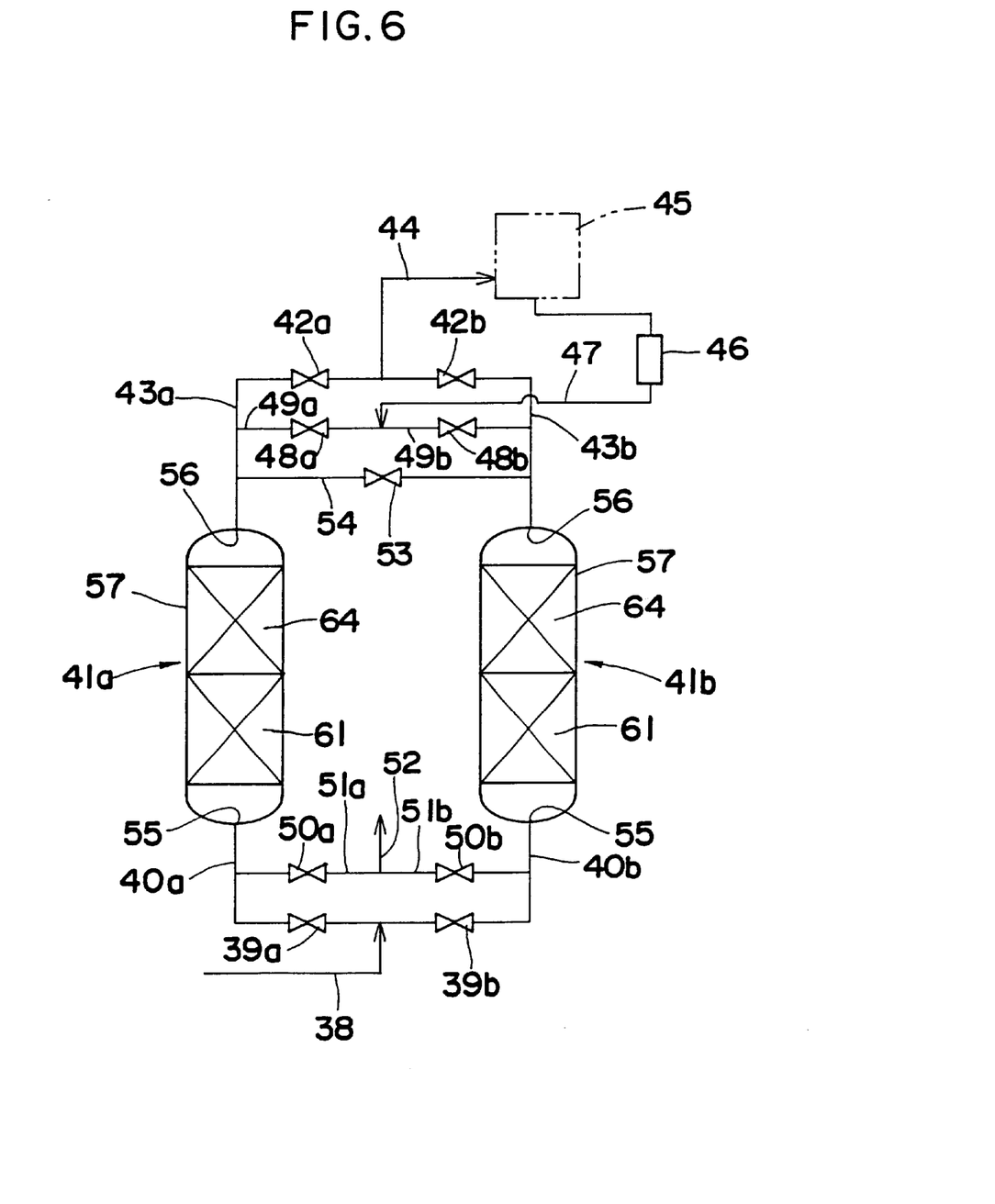
FIG. 6 is a system chart showing a gas purifying apparatus according to a fourth embodiment of the present invention.

While in the embodiments shown in FIGS. 5 and 6, the adsorbent layer(s) and the treating agent layer are packed separately layerwise in a single container 57 in the above-described orders respectively, they may be packed into different containers respectively or into two containers (one containing two adsorbent layers and the other containing one treating agent layer) which are arranged in series in the above-described orders respectively. Such constitutions are of course included in the present invention. Further, in the embodiments shown in FIGS. 3 to 6, a carbon dioxide and water adsorptive adsorbent may be admixed to the treating agent.

Test Examples employing the embodiments shown in FIGS. 3 to 6 will be described below.

TEST EXAMPLE 1

Figure 3:
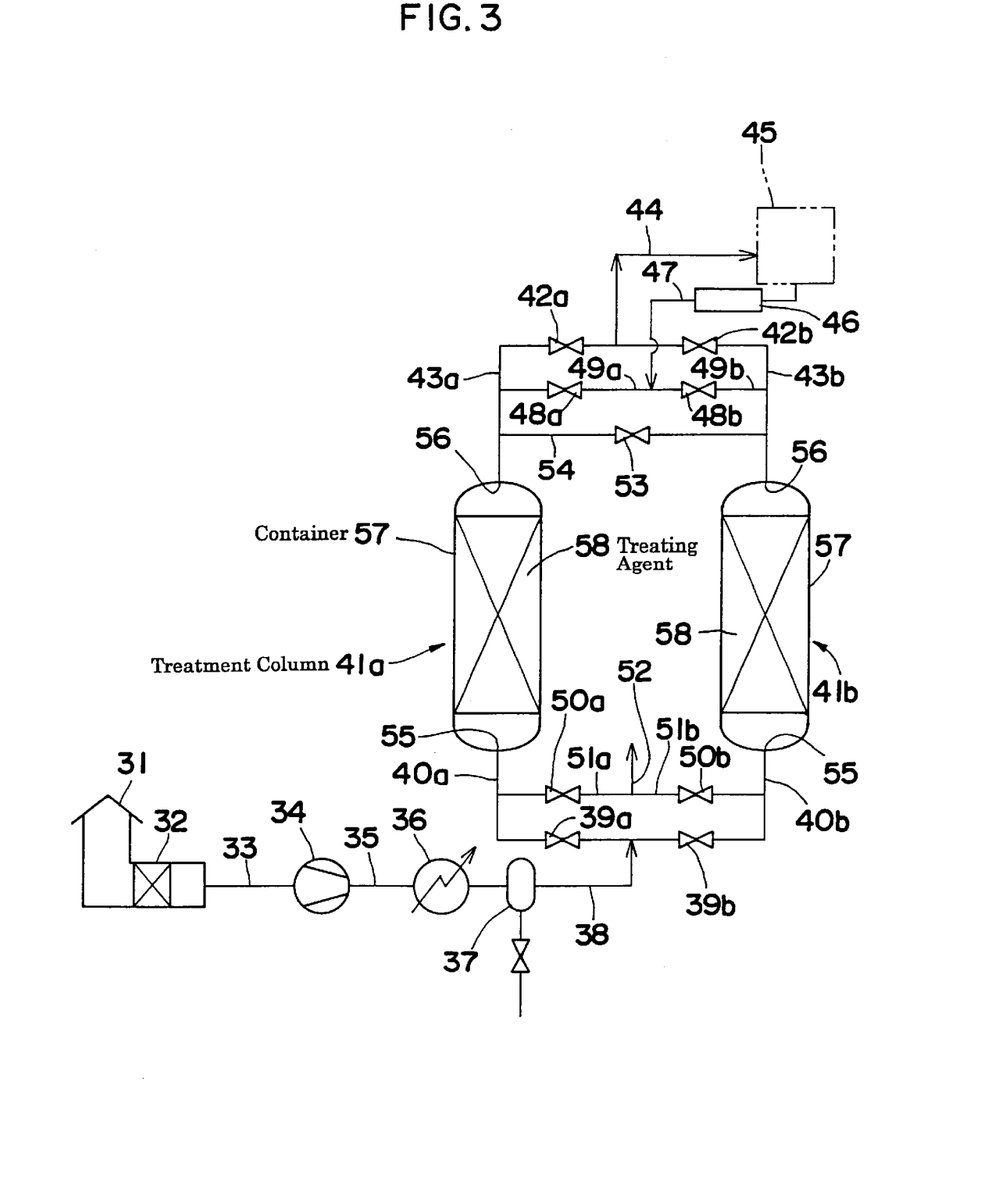
FIG. 3 is a system chart showing a gas purifying apparatus according to a first embodiment of the present invention.

As a test example of the embodiment shown in FIG. 3, the following treating agents were packed into columns (two columns per treating agent) corresponding to the treatment columns 41a and 41b:

1) a treating agent consisting of Na-X type zeolite as a carrier having carbon dioxide and water adsorptivity, and palladium carried thereon;
2) a treating agent consisting of Na-X type zeolite as a carrier having carbon dioxide and water adsorptivity, and $Au/\alpha\text{-}Fe_2O_3$ carried thereon;
3) a treating agent consisting of Na-X type zeolite as a carrier having carbon dioxide and water adsorptivity, and an Au colloidal powder carried thereon; and
4) a treating agent consisting of activated alumina as a carrier having carbon dioxide and water adsorptivity, and palladium carried thereon.

A sample gas was introduced to each column to carry out purification test of removing carbon monoxide and hydrogen contained in the gas. The treating agents packed into the columns were subjected to activation treatment at a temperature of 150° C. or higher, respectively, and the thus activated agents were used as specimens. As the sample gas, a gas containing saturated water, about 400 ppm of carbon dioxide, 5 ppm of carbon monoxide and 10 ppm of hydrogen was prepared and was allowed to flow through the columns. The column temperature was maintained at 40° C. The sample gas was fed under a pressure of 5 kgf/cm² G for 7 hours continuously.

Figure 7:
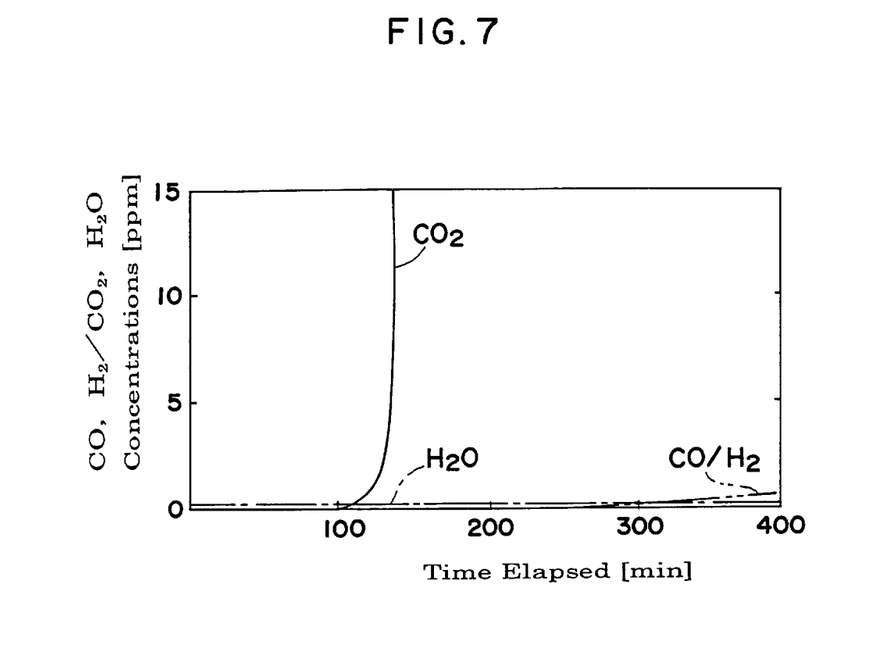
FIGS. 7 to 10 are charts showing test results of Test Example 1 respectively.

The results of purification test carried out using the treating agent 1) are shown in FIG. 7. Both carbon monoxide and hydrogen were oxidized and removed and were not substantially detected during the test period. However, in the latter half of the test period, oxidation activity of the treating agent was lowered with the increase in the amount of water adsorbed, and carbon monoxide and hydrogen were detected in a small amount ($\leq 1$ ppm). Carbon dioxide broke through the treating agent at a relatively early stage, the water content in the purified gas was −80° C. or lower in terms of dew point.

Figure 8:
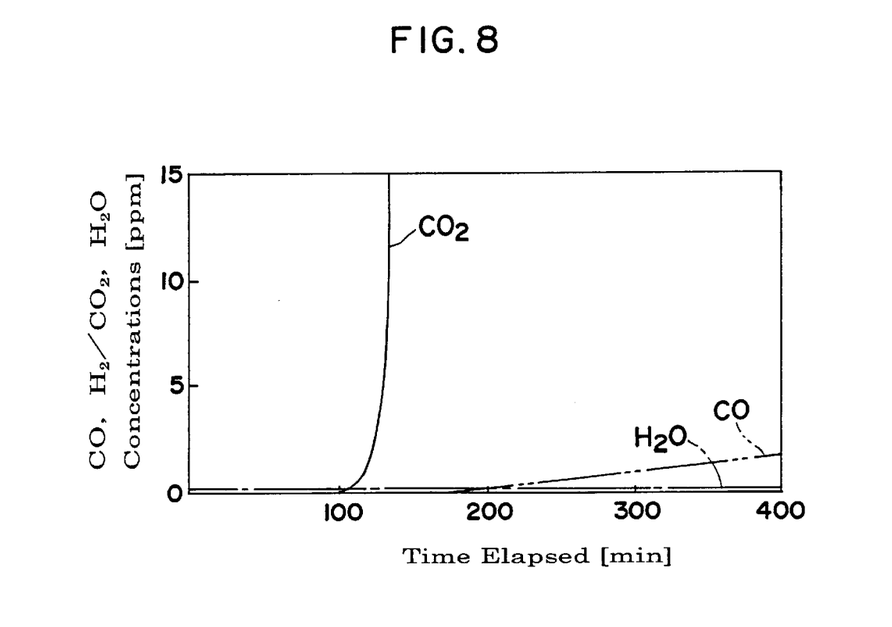
Figure 9:
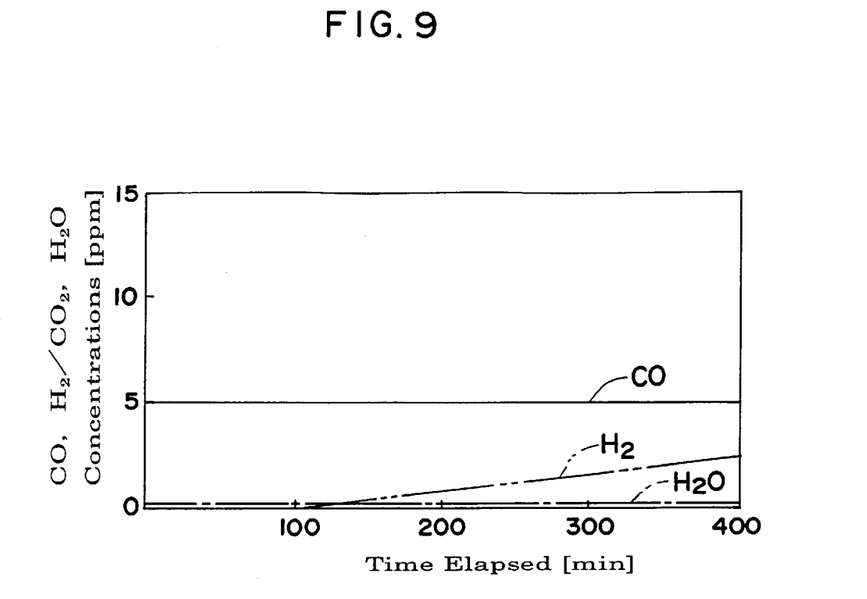

The results of purification test carried out using the treating agent 2) and those carried out using the treating agent 3) are shown in FIG. 8 and in FIG. 9, respectively. In FIG. 8, both carbon monoxide and hydrogen were oxidized and removed and were not substantially detected during the test period. However, in the latter half of the test period, oxidation activity of the treating agent was lowered with the increase in the amount of water adsorbed, and carbon monoxide was detected in a small amount (ca. 1 to 3 ppm). Carbon dioxide broke through the treating agent at a relatively early stage, and the water content in the purified gas was −80° C. or less in terms of dew point. FIG. 9 shows the results of test carried out using a catalyst carrying thereon an Au colloidal powder. Carbon monoxide failed to be oxidized at this column temperature (40° C.) and was detected in the same concentration as in the original raw gas. Although hydrogen. was oxidized and removed, the activity of the treating agent was lowered with the increase in the amount of water adsorbed, and hydrogen was detected in a small amount (2.5 ppm). The water content of the purified gas was −80° C. or lower in terms of dew point.

Figure 10:
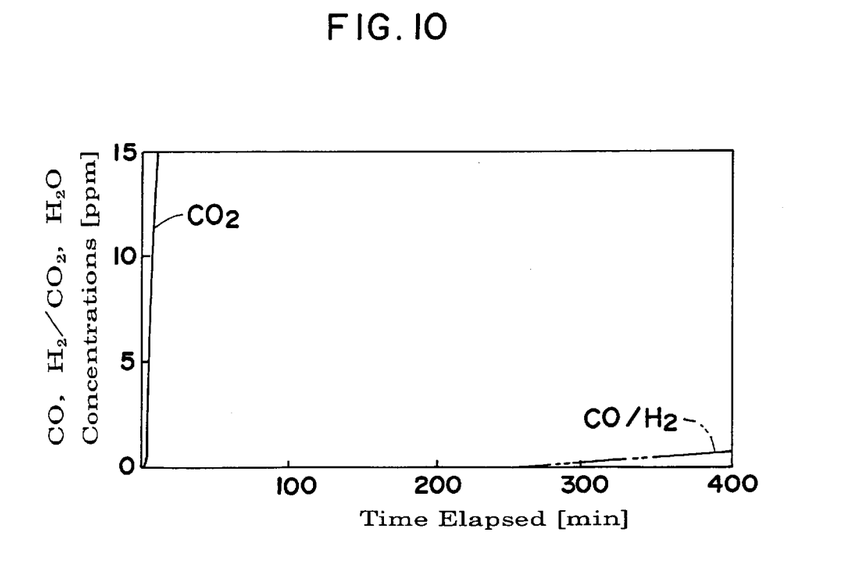

Results of test carried out using the treating agent 4) are shown in FIG. 10. Both carbon monoxide and hydrogen were oxidized and removed and were not substantially detected during the test period. However, in the latter half of the test period, oxidation activity of the treating agent was lowered with the increase in the amount of water adsorbed, and carbon monoxide and hydrogen were detected in a small amount ($\leq 1$ ppm). While the water content of the purified gas was maintained at −80° C. or lower in terms of dew point, the amount of carbon dioxide adsorbed was extremely small.

Next, Test Examples employing the embodiments shown in FIG. 4, 5 and 6 will be described below.

TEST EXAMPLE 2

In the embodiment shown in FIG. 4, the following treating agents were packed into the columns 41a and 41b (two columns per two treating agents respectively; provided 6 columns in total):

5) a Pd-on-activated alumina treating agent and a treating agent consisting of Na-X type zeolite having carbon dioxide adsorptivity and Au/α-$Fe_2O_3$ carried thereon;

6) a Pd-on-activated alumina treating agent and a treating agent consisting of Na-X type zeolite having carbon dioxide adsorptivity and an Au colloidal powder carried thereon; and 7) a treating agent consisting of activated alumina and Au/α-$Fe_2O_3$ carried thereon and a treating agent consisting of Na-X type zeolite having carbon dioxide adsorptivity and palladium carried thereon.

Each pair of columns were subjected to the treatment step and to the regeneration step alternately every four hours.

In the treatment step, air containing 5 ppm of carbon monoxide and 10 ppm of hydrogen was introduced to the treatment column under a pressure of about 6 kg/$cm^2$ G and at a temperature of about 50° C.; whereas in the regeneration step, the resulting purified air which was employed as the regeneration purge gas was introduced in an amount corresponding to 40% of the raw air to the treatment column at a temperature of 150° C.

As a result, the raw air purified through any of the columns packed with the treating agents 5), 6) and 7) respectively showed a carbon monoxide content of $\leq 0.5$ ppm which is the detection limit of measuring instruments, while the hydrogen content was 0.1 ppm which is the detection limit of measuring instruments. Further, carbon dioxide was 1 ppm or less, and water content was −80° C. or lower in terms of dew point.

TEST EXAMPLE 3

In the embodiment shown in FIG. 5, the treatment columns 41a and 41b were each packed with a first adsorbent layer 61 of activated alumina, a second adsorbent layer 62 of Na-X type zeolite and a treating agent layer of the treating agent 5), 6) or 7) used in Test Example 2 (two columns per treating agent, 6 columns in total). Each pair of columns were subjected to the treatment step and to the regeneration step alternately every four hours.

With respect to the treating agents 5) and 6) used in Test Example 2, the Pd-on-activated alumina treating agent was packed in each column on the upstream side (in terms of air flow), with the Au/α-$Fe_2O_3$-on-Na-X type zeolite treating agent or the Au colloidal powder-on-Na-X type zeolite treating agent being packed on the downstream side of the Pd-on-activated alumina treating agent. With respect to the treating agent 7), the Au/α-$Fe_2O_3$-on-activated alumina treating agent, and the treating agent consisting of Na-X type zeolite having carbon dioxide adsorptivity and palladium carried thereon were packed into the column in this order. When the treatment step and the regeneration step were carried out in the same manner as in Test Example 2, there were obtained similar results to those in Test Example 2.

TEST EXAMPLE 4

In the embodiment shown in FIG. 5, the treatment columns 41a and 41b (6 columns in total) were each packed with a first adsorbent layer 61 of activated alumina, a second adsorbent layer 62 of Na-X type zeolite, a treating agent layer 63 containing the treating agents 5), 6) and 7) used in Test Example 2 and, on the downstream side (in terms of air flow) of the layer 63, a back-up Na-X type zeolite layer. Each pair of columns were subjected to the treatment step and to the regeneration step alternately every four hours. Incidentally, with respect to the treating agents 5), 6) and 7) used in Test Example 2, they were mixed, and the resulting mixture was packed into each column. When the treatment step and the regeneration step were carried out in the same manner as in Test Example 1, there were obtained similar results to those in Test Example 1.

TEST EXAMPLE 5

In the embodiment shown in FIG. 6, the treatment columns 41a and 41b were each packed with an adsorbent layer 61 of activated alumina and an adsorbent-treating agent mixed layer 64 of Na-X type zeolite and the treating agents 5), 6) and 7) used in Test Example 2 in this order from the upstream side in terms of air flow (three pairs of columns, 6 columns in total). Each pair of columns were subjected to the treatment step and to the regeneration step alternately every four hours. Incidentally, with respect to the treating agents 5), 6) and 7) used in Test Example 2, they were mixed, and the resulting mixture was packed into the columns. When the treatment step and the regeneration step were carried out in the same manner as in Test Example 1, there were obtained similar results to those in Test Example 1.

TEST EXAMPLE 6

In the embodiment shown in FIG. 5, the treatment columns 41a and 41b (two columns in total) were each packed with a first adsorbent layer 61 of activated alumina, a second adsorbent layer 62 of Na-X type zeolite, and 8) a treating agent layer 63 containing a treating agent consisting of a Na-X type zeolite carrier having carbon dioxide and water adsorptivity and platinum carried thereon.

Figure 11:
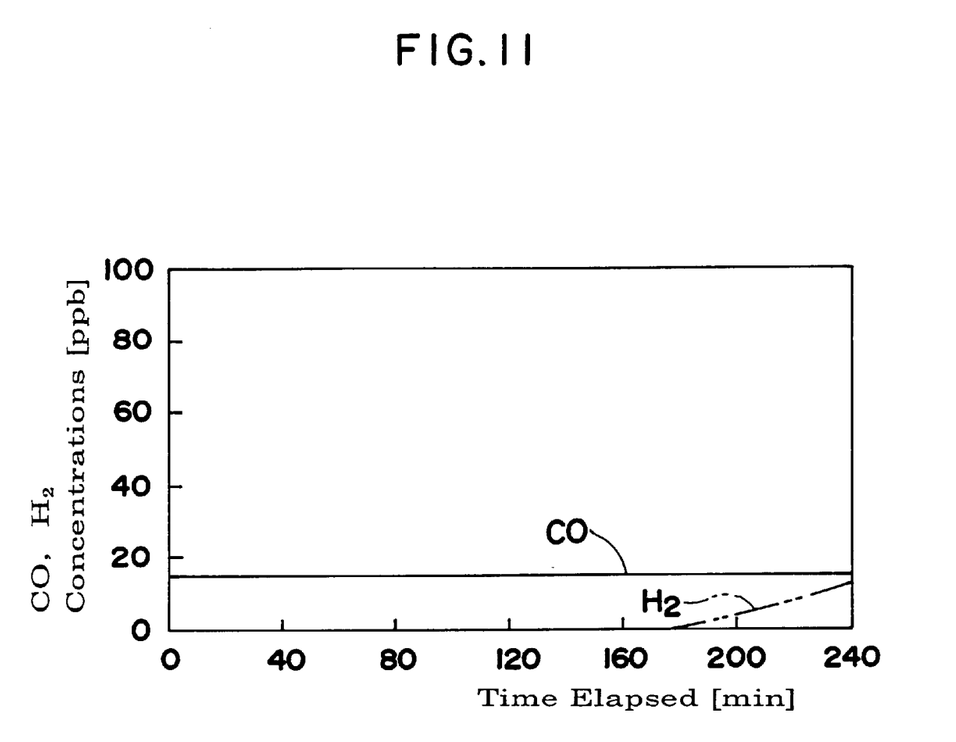
FIG. 11 is a chart showing test results of Test Example 6.

A sample gas saturated with water and containing about 400 ppm of carbon dioxide, 5 ppm of carbon monoxide and 10 ppm of hydrogen was allowed to flow through the columns at a temperature of 10° C. and under a pressure of 8 kgf/cm$^2$ G. The treatment step and the regeneration step were carried out alternatively every four hours, and the results of purification treatment obtained are shown in FIG. 11. Both carbon monoxide and hydrogen were oxidized and removed, and they were not substantially detected during the test period.

When measurement was carried out with the detection limit of the measuring instrument being increased to 1000-fold as much as in the cases of Test Examples 1 to 5, carbon monoxide was detected in an amount of 15 ppb or less, while hydrogen was detected in a very small amount (10 ppb) in the latter half of the switching time.

TEST EXAMPLE 7

In the embodiment shown in FIG. 6, the treatment columns 41a and 41b were each packed with a first adsorbent layer 61 of activated alumina and an adsorbent-treating agent mixed layer 64 containing a mixture of Na-X type zeolite and the treating agent 8) (platinum-on-Na-X type zeolite) used in Test Example 6 in this order from the upstream side (in terms of air flow). When the columns were subjected to the treatment step and to the regeneration step alternately every four hours under flow of the same sample gas as used in Test Example 6, similar results to those in Test Example 6 were obtained.

Although some embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method of treating a gas containing carbon monoxide and/or hydrogen, comprising:

contacting the gas with a gas purification-treating agent in the presence of oxygen;

reacting carbon monoxide and/or hydrogen with oxygen to carbon dioxide and water; and adsorbing the carbon dioxide and the water simultaneously, the agent comprising (i) a catalyst being a metal or metal compound which activates oxidation reaction of carbon monoxide and/or hydrogen, and (ii) a carrier of the catalyst being an adsorbent which adsorbs carbon dioxide and water, wherein the metal or metal compound is at least one selected from an Au-on-metal oxide, an Au-on-metal hydroxide and an Au colloidal powder.

2. The method according to claim 1, wherein the agent adsorbs carbon dioxide and water contained originally in the gas, as well as carbon dioxide and water to be formed by the oxidation reaction of carbon monoxide and/or hydrogen.

3. The method according to claim 1, wherein the Au-on-metal oxide is at least one selected from Au/α-Fe$_2$O$_3$, Au/TiO$_2$, Au/SnO$_2$, Au/ZnO$_2$, Au/Co$_3$O$_4$, Au/NiO, Au/InO$_2$, Au/NiFeO$_4$; while the Au-on-metal hydroxide is at least one selected from Au/Mg(OH)$_2$ and Au/Be(OH)$_2$.

4. The method according to claim 1, wherein the gas is contacted with the gas purification-treating agent at a temperature in the range of 0 to 100° C.

5. A method of treating a gas containing carbon monoxide and/or hydrogen, comprising:

contacting the gas with a gas purification-treating agent in the presence of oxygen;

reacting carbon monoxide and/or hydrogen with oxygen to carbon dioxide and water; and adsorbing the carbon dioxide and the water simultaneously, the agent comprising (i) a catalyst being a metal or metal compound which activates oxidation reaction of carbon monoxide and/or hydrogen, and (ii) a carrier of the catalyst being an adsorbent which adsorbs carbon dioxide and water, wherein the carrier is a porous adsorbent while the metal is palladium.

6. The method according to claim 5, wherein the agent adsorbs carbon dioxide and water contained originally in the gas, as well as carbon dioxide and water to be formed by the oxidation reaction of carbon monoxide and/or hydrogen.

7. The method according to claim 5, wherein the gas is contacted with the gas purification-treating agent at a temperature in the range of 0 to 100° C.

8. A method of treating a gas containing carbon monoxide and/or hydrogen, comprising:

contacting the gas with a gas purification-treating agent in the presence of oxygen;

reacting carbon monoxide and/or hydrogen with oxygen to carbon dioxide and water; and adsorbing the carbon dioxide and the water simultaneously, the agent comprising (i) a catalyst being a metal or metal compound which activates oxidation reaction of carbon monoxide and/or hydrogen, and (ii) a carrier of the catalyst being an adsorbent which adsorbs carbon dioxide and water, wherein the metal or metal compound is palladium.

9. The method according to claim 7, wherein the agent adsorbs carbon dioxide and water contained originally in the gas, as well as carbon dioxide and water to be formed by the oxidation reaction of carbon monoxide and/or hydrogen.

10. The method according to claim 8, wherein the gas is contacted with the gas purification-treating agent at a temperature in the range of 0 to 100° C.

* * * * *